(12) United States Patent
Yarlagadda et al.

(10) Patent No.: US 7,751,316 B2
(45) Date of Patent: Jul. 6, 2010

(54) RELAY SERVER FOR SIP/RTP MESSAGES WITH BUFFER MANAGEMENT

(75) Inventors: Madhu Yarlagadda, Los Altos, CA (US); Jamie L. Wiegand, Bothell, WA (US)

(73) Assignee: Yahoo! Inc., Sunnyvale, CA (US)

( * ) Notice: Subject to any disclaimer, the term of this patent is extended or adjusted under 35 U.S.C. 154(b) by 1019 days.

(21) Appl. No.: 11/128,897

(22) Filed: May 13, 2005

(65) Prior Publication Data

US 2006/0256721 A1 Nov. 16, 2006

(51) Int. Cl.
*H04J 1/16* (2006.01)
(52) U.S. Cl. .................. 370/230; 370/352; 370/354; 370/466
(58) Field of Classification Search ......... 370/229–235, 370/351–356
See application file for complete search history.

(56) References Cited

U.S. PATENT DOCUMENTS

| | | | |
|---|---|---|---|
| 6,567,419 B1 | 5/2003 | Yarlagadda | |
| 6,690,645 B1* | 2/2004 | Aweya et al. | 370/230 |
| 6,744,767 B1* | 6/2004 | Chiu et al. | 370/395.21 |
| 6,996,062 B1* | 2/2006 | Freed et al. | 370/235 |
| 7,324,535 B1* | 1/2008 | Goss et al. | 370/411 |
| 7,369,489 B1* | 5/2008 | Bhattacharya et al. | 370/235 |
| 7,372,814 B1* | 5/2008 | Chiruvolu et al. | 370/235 |
| 7,417,978 B1* | 8/2008 | Chou et al. | 370/352 |
| 2003/0007496 A1* | 1/2003 | Brown et al. | 370/401 |
| 2004/0022190 A1 | 2/2004 | Davies et al. | |
| 2004/0032860 A1 | 2/2004 | Mundra et al. | |
| 2004/0160979 A1 | 8/2004 | Pepin et al. | |
| 2006/0174023 A1* | 8/2006 | Horn et al. | 709/231 |
| 2007/0286165 A1* | 12/2007 | Chu et al. | 370/352 |

FOREIGN PATENT DOCUMENTS

| | | |
|---|---|---|
| EP | 1 161 038 A2 | 12/2001 |
| WO | WO-01/78430 | 10/2001 |

* cited by examiner

*Primary Examiner*—Jason E Mattis
*Assistant Examiner*—Dady Chery
(74) *Attorney, Agent, or Firm*—Darby & Darby PC; John W. Branch (57) ABSTRACT

A system, method, and apparatus are directed towards managing a Voice over IP (VOIP) messages over a network, employing the Real-time Transport Protocol (RTP) and Session Initiation Protocol (SIP) over the Transmission Control Protocol (TCP). The VOIP messages are sent by a source device to a destination device through a relay server. The relay server may throttle the VOIP messages employing buffer management. When the buffer is substantially full, the relay server will drop packets from the source device. Indication of the lost packets may be provided to the source device through a Real-time Transport Control Protocol (RTCP) report. The source device may then employ the RTCP report to modify a type of codec employed, and thereby adjust a rate of flow of VOIP packets sent towards the destination device. Additionally, the relay server may provide port translation services for RTP/RTCP packets between the source and destination devices.

17 Claims, 8 Drawing Sheets

RELAY SERVER FOR SIP/RTP MESSAGES WITH BUFFER MANAGEMENT

BACKGROUND OF THE INVENTION

The present invention relates generally to network communications, and more particularly, but not exclusively, to a system and method for relaying a Session Initiation Protocol/Real-time Transport Protocol (SIP/RTP) message over a network with buffer management.

Internet Protocol (IP) Telephony, also known as Voice over Internet Protocol (VOIP), is a technology that makes it possible to have a voice conversation over an IP network, such as the Internet, instead of a dedicated voice transmission line.

Depending on the service, one way to place a VOIP call is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to be able to integrate at least some of the VOIP features with a variety of other communication services.

However, because IP does not by default provide any mechanism to ensure that data packets are delivered in sequential order, or provide any quality of service guarantees, many implementations of VOIP face problems dealing with latency and/or possible data integrity issues. Another problem with at least some of the VOIP implementations is that they may be unable to provide VOIP traffic through firewalls, network address translation (NAT) devices, and the like. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for managing a Voice over IP (VOIP) messages over a network, where the VOIP messages may employ the Real-time Transport Protocol (RTP) and Session Initiation Protocol (SIP) over the Transmission Control Protocol (TCP). In one embodiment, VOIP messages that initially employ RTP (and possibly SIP) over the User Datagram Protocol (UDP) are translated to use the TCP protocol. By employing the TCP transport protocol the invention may improve the likelihood that the VOIP message will be routed through a firewall, NAT, and the like.

The VOIP messages are typically sent by a source device to a destination device through a relay server. In one embodiment the VOIP messages may be sent through the relay server when a direct connection between the source and destination is unavailable. The invention is not limited to this situation, however, and, the relay server may also be used even though a direct connection is available. This might be the case, for example, where the network conditions through the relay server may be better compared to a direct connection. The relay server is configured to throttle the VOIP messages employing buffer management and reports. The buffer is set to a predetermined size. When the buffer is substantially full with transmit packets from the source device and/or retransmits due to packets that are lost between the relay server and the destination device, the relay server may drop transmit packets from the source device. Packet loss may arise for any of a variety of reasons. For example, the source device may have more bandwidth at its end, than the destination device. In any event, indication of the lost packets may be provided to the source device through a Real-time Transport Control Protocol (RTCP) report. The source device may then employ the RTCP report to modify a type of COmpressor/DECompressor (codec) employed, and thereby adjust a rate of flow of VOIP packets sent towards the destination device. In one embodiment, the RTCP report is provided by the destination device. In another embodiment, the RTCP report is provided by the relay server. In addition, the relay server may increase its buffer size, after some predetermined time, event, condition, or the like, such as when it is determined that there has been no significant packet loss between the relay server and the destination device. The invention, however, is not limited to employing the RTCP reporting mechanism, and virtually any other mechanism may be employed to indicate to indicate flow congestion, and/or other quality of service issues. Moreover, the source device may further employ virtually any other mechanism to modify a rate of flow of VOIP packets towards the relay server, without departing from the scope or spirit of the invention.

Moreover, the relay server may be further configured to enable a port translation for RTP/RTCP communications between source and destination devices. Such port translation may be performed to overcome a restriction that may arise, for example, when a filtering device, such as a firewall, gateway, NATs, and the like reside between the source device, the relay server, and/or the destination device.

Illustrative Operating Environment

Figure 1:
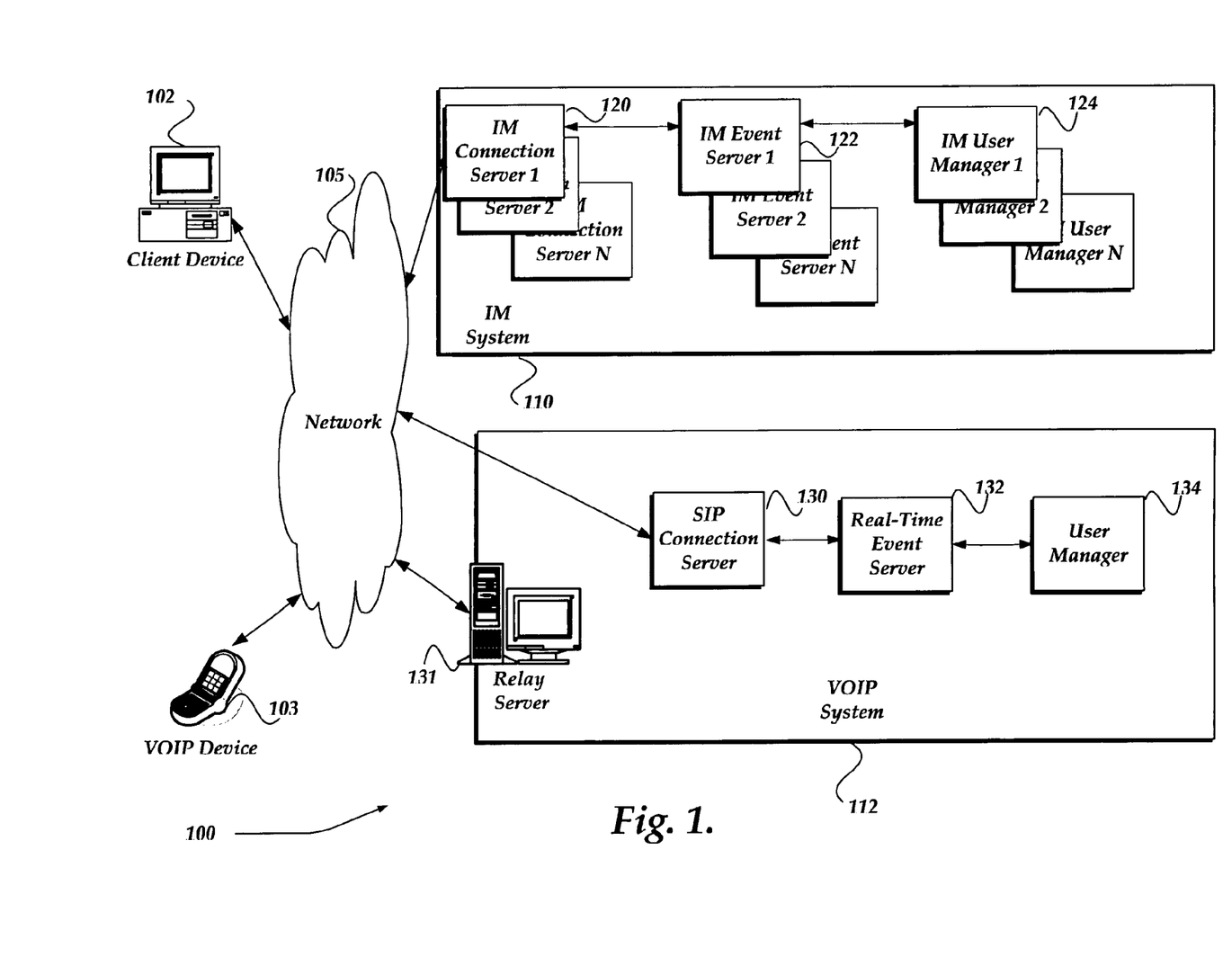
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client device 102, VOIP device 103, network 105, IM system 110, and VOIP system 112. IM system 110 may include IM connection servers 120, IM event servers 122, and IM user managers 124. VOIP system 112 includes relay server 131, SIP connection server 130, Real-Time event server 132, and user manager 134.

Client device 102 is in communication with IM connection servers 120, SIP connection server 130, and relay server 131 through network 105. VOIP device 103 is in communication with IM connection servers 120, SIP connection server 130, and relay server 131 through network 105. IM event servers 122 are in communication with IM connection servers 120 and IM user managers 124. Real-time event server 132 is in communication with SIP connection server 130 and user manager 134.

VOIP device 103 may include virtually any device that is arranged to send and receive media communications and messages such as VOIP messages via one or more wired and/or wireless communication interfaces. For example, VOIP device 103 may be configured to send and/or receive VOIP messages between client device 102 through relay server 131.

Typically, VOIP device 103 may be configured to communicate using any of a variety of protocols. For example, VOIP device 103 may be configured to employ RTP for communicating media data such as audio and video to another device. However, the invention is not so limited, and another media data mechanism may be employed, including IAX, and the like. VOIP device 103 may also employ the SIP protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Typically, however, VOIP device 103 may employ SIP over either UDP or TCP and RTP over UDP.

VOIP device 103 may also be configured to provide an identifier, sometimes known as an originating line identifier (OLI) during a communication. The identifier may employ any of a variety of mechanisms, including a device model number, a carrier identifier, a mobile identification number (MIN), and the like. The MIN may be a telephone number, a Mobile Subscriber Integrated Services Digital Network (MS-ISDN), an electronic serial number (ESN), or other device identifier. The OLI may also be an IP address associated with VOIP device 103. In one embodiment, the identifier is provided with each communication. In another embodiment, the identifier is provided by an end-user.

Devices that may operate as VOIP device 103 include personal computers, desktop computers, smart phones, Personal Digital Assistants (PDAs), handheld computers, programmable consumer electronics, standard telephones configured with an analog telephone adaptor (ATA), an IP phone, a mobile device, and the like.

One embodiment of client device 102 is described in more detail below in conjunction with FIG. 2. Briefly, however, client device 102 may include virtually any computing device capable of receiving and sending a message over a network. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may be further configured to receive a VOIP message in one format and to provide the message over network 105 in another format to a remote device such as IM connection servers 120, relay server 131, SIP connection server 130, and the like. Client device 102 may employ a local proxy agent (not shown) that is configured to receive the VOIP message and determine whether the message is to be transformed to such as the UDP protocol. If the message is employing the UDP protocol, the local proxy agent may convert the message format to another transport protocol, such as TCP, or the like. Client device 102 may also manage the message using an IM client (not shown). In one embodiment, the local proxy agent is integrated within the IM client. The local proxy agent may also transform the message using a port translation, packet encapsulation, or the like.

Client device 102 may further be configured to send the message over network 105 to IM connection servers 120, SIP connection server 130, relay server 131, and the like. Upon receipt of a response, such as from IM connection servers 120, SIP connection server 130, relay server 131, and the like, the local proxy agent may perform actions that may convert the received response into another format. For example, the local proxy agent may convert a response employing RTP over TCP, or the like, to RTP over UDP, or the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 may include any communication method by which information may travel between computing devices.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection servers 120, IM event servers 122, and IM user managers 124 to manage one or more IM sessions. In one embodiment, IM connection servers 120, IM event servers 122, and IM user managers 124 may represent separate server processes operating with a single computing device. In another embodiment, IM connection servers 120, IM event servers 122, and IM user managers 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection servers 120 are configured to receive a request to establish an IM session from an IM client, such as might be included within client device 102, VOIP device 103, and the like. IM connection servers 120 may also receive from the IM client authentication information that may be employed to authenticate an end-user of the IM client. If the end-user is authenticated, IM connection servers 120 may enable the IM client to log into the IM session. IM connections servers 120 may also be configured to provide information about the established session to IM event servers 122.

IM connections servers 120 may also forward various request information from the IM client to IM event servers 122. Such request information may include, for example, a request to locate and communicate with another IM end-user.

IM event servers 122 are configured to receive the end-user's log in and other request information from IM connections servers 120. IM event servers 122 may request IM user managers 124 to store information about the IM client and end-user. IM user mangers 124 may employ a table, spreadsheet, file, database, and the like, to register the IM client, and on which IM connection server, within IM connection servers 120, the IM client is logged into. Thus, IM user managers 124 may store information about various IM conversations that may include such information as identifiers for end-users associated with an IM conversation, time information, account identifiers for the end-users, IM connection servers associated with an IM conversation, and so forth. As such, IM event servers 122 may also employ IM user managers 124 to determine which IM connection server, within IM connection servers 122, another end-user is logged into, and provide such information to IM connection servers 120, so that an IM session may be established between two or more IM end-users.

VOIP system 112 is configured to manage VOIP sessions between client devices using any of a variety of VOIP protocols. VOIP system 112 is further configured to enable a variety of client devices and client applications to access voice mail messages.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

One embodiment of relay server 131 is described in more detail below in conjunction with FIG. 3. Briefly, however, relay server 131 is configured to manage messages, such as media messages between one computing device and another, such as client device 102, VOIP device 103, and the like. Relay server 131 may, for example, receive a VOIP packet, such as a TCP/IP packet and save the packet in a buffer until it may be relayed towards a destination device. Relay server 131 may also be configured to monitor flow congestion, quality of service characteristics, and the like, associated with a communication between itself and the destination device, and/or the source device. When the communication is considered to have degraded, such as might result from a predefined number of packet retransmits, relay server 131 may provide an indication of the degradation to the source device. In one embodiment, the indication of degradation is provided through a Real-time Transport Control Protocol (RTCP) report. The RTCP report may be initiated by the destination device and/or relay server 131. The source device may then be configured to employ the RTCP report, or similar indication of degradation to adjust its transmission of VOIP packets.

In addition, relay server 131 may be further configured to enable a port translation for RTP/RTCP communications between source and destination devices. Such port translation may be performed to overcome a restriction that may arise, for example, when a filtering device, such as a firewall, gateway, NATs, and the like reside between the source device, the relay server, and/or the destination device. Such port translations are described in more detail below in conjunction with FIGS. 6-7.

Devices that may operate as relay server 131 include personal computers, desktop computers, multiprocessor systems, microprocessor-based or programmable consumer electronics, network PCs, servers, firewalls, gateways, network address translators, bridges, routers, and the like.

SIP connection server 130 is configured to receive a request to establish a SIP connection from client device 102, VOIP device 103, and the like. The requesting device may provide identification information to SIP connection server 130 that may be used, at least in part, to authenticate the request to establish the SIP connection. If the requesting device is authenticated, SIP connection server 130 may enable the requesting device to log into a connection. SIP connection server 130 may also provide information about the requesting device to real-time event server 132. Real-time event server 132 may be configured to receive the information and provide it to user manager 134 for storage.

User manager 134 may store the information in a database, spreadsheet, table, file, and the like. Such information may include, for example, an identifier associated with the requesting device, an end-user associated with the requesting device, an address associated with SIP connection server 130, and the like. User manager 134 may receive and manage such information for a plurality of requesting device. User manager 134 may also provide information to real-time event server 132 about at least one other requesting device, such that SIP connection server 130 may enable a VOIP communication between one or more end-user devices, such as client device 102, VOIP device 103, and the like. In one embodiment, the one or more end-user devices may employ relay server 131 to relay the VOIP communications between them. For example, SIP connection server 130 may provide a token, certificate, ticket, or similar authentication/authorization mechanism, to the one or more end-user devices. The one or more end-user devices may then provide the authentication/authorization mechanism to relay server 131 to establish the communications.

Illustrative Client Device

Figure 2:
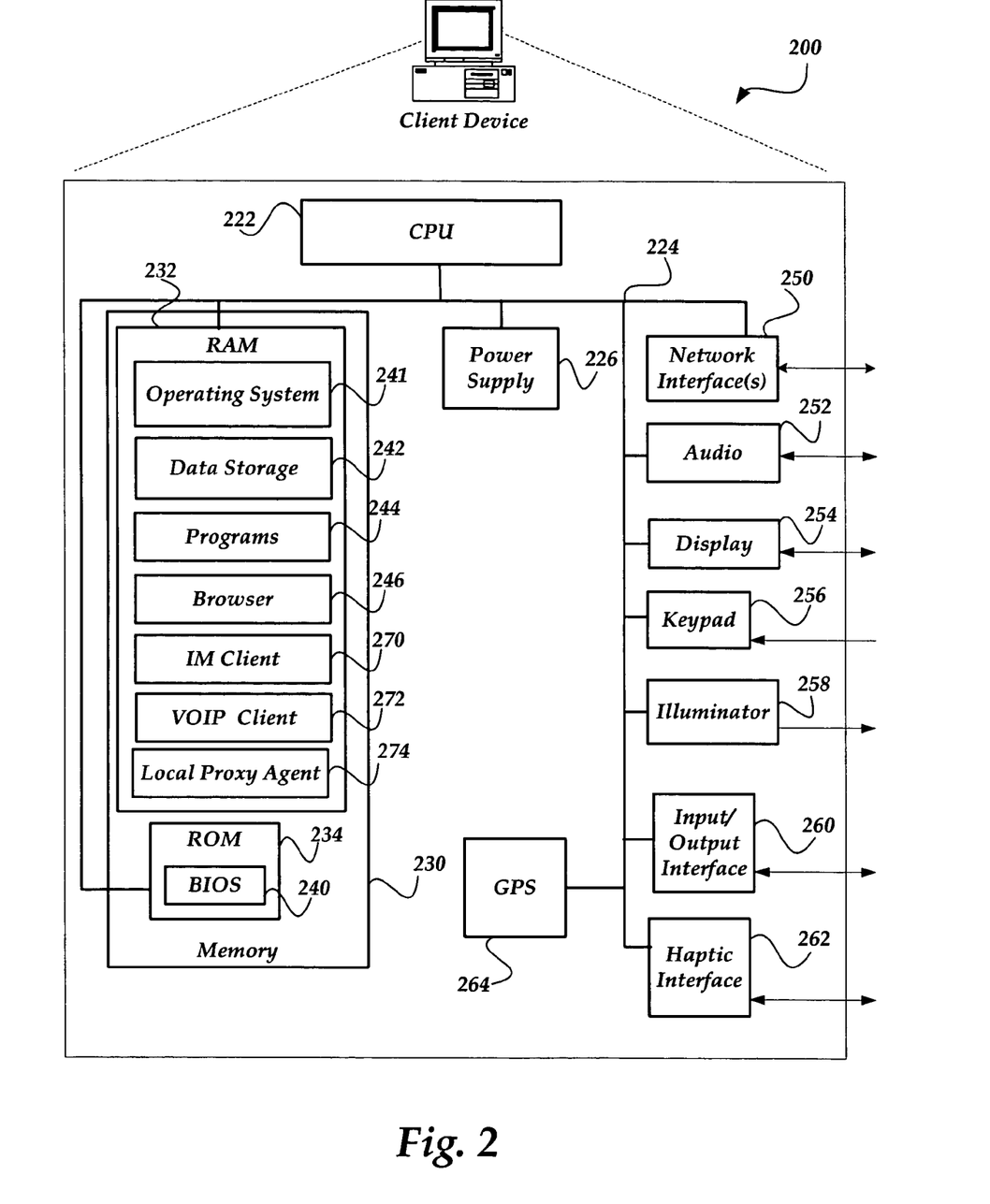
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, codec programs, and so forth. In addition, mass memory 230 stores browser client 246, IM client 270, VOIP client 272, and local proxy agent 274.

Browser 246 may be configured to receive and to send web pages, web-based messages, and the like. Browser 246 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

IM client 270 may be configured to initiate and manage an instant messaging session, including, but not limited to AOL Instant Messenger, Yahoo! Messenger, NET Messenger Server, ICQ, and the like. In one embodiment, IM client 270 is configured to employ a VOIP client, such as VOIP client 272 to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, and the like.

VOIP client 272 is configured to enable client device 200 to initiate and manage a VOIP session with another client device. VOIP client 272 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, Skinny Client Control Protocol (SCCP), and the like. VOIP client 272 is further configured to employ virtually any media codec to compress the media stream for communicating it over the network, including G.711, G.729, G.729a, iSAC, Speex, and the like. In one embodiment, SIP may be employed to enable a Session Description Protocol (SDP).

VOIP client 272 may further be configured to receive VOIP data and signals from another device, and may then provide, at least the media data (RTP) traffic, and perhaps the SIP portion, to local proxy agent 274 for possible conversion.

VOIP client 272 may be further configured to manage a flow of VOIP packets to and/or from another computing device. In one embodiment, VOIP client 272 may employ these components to provide the packets using RTP with RTCP. VOIP client 272 may employ an RTCP report from a destination device to determine various qualities of communications, including flow control, congestion control, quality of service, and the like. VOIP client 272 may, for example, determine, based at least in part, on the RTCP report that it may want to modify its transmission of the RTP packets.

Thus, in one embodiment, VOIP client 272 may elect to employ a lower speed codec, or the like. Such actions by VOIP client 272 are directed towards reducing a number of packets transmitted, and/or otherwise slowing down the flow of packets. This may provide the destination device a sufficient opportunity to catch-up. The invention is not limited to modifying the codecs, however, and virtually any other mechanism may be employed to modify the transmission of packets, without departing from the scope or spirit of the invention.

Although not shown, client device 200 may also be configured to receive a message from another computing device, employing another mechanism, including, but not limited to email, Short Message Service (SMS), Multimedia Message Service (MMS), internet relay chat (IRC), mIRC, and the like.

Local proxy agent 274 is configured to receive a VOIP message and, as appropriate, convert it to another format. For example, local proxy agent 274 may receive a VOIP message that employs the SIP/RTP protocols. Local proxy agent 274 may examine a transport protocol used by the received VOIP message to determine if it is UDP, TCP, or the like. Local proxy agent 274 may then be further configured to convert the message, if it employs the UDP protocol. Local proxy agent 274 may, for example, convert the message to SIP over TCP and RTP over TCP. Local proxy agent 274 may further perform a port translation such that the message may be forwarded over a predefined port number, and thereby further transliterating the message onto a port that is configured to operate with a destination device. Local proxy agent 274 may also enable the converted message to be sent towards its destination over a network, such as network 105 of FIG. 1. Furthermore, local proxy agent 274 may also send the converted message to VOIP client 272 to be sent by it over the network.

Local proxy agent 274 also may employ any of a variety of other conversions, transformations, and the like, upon the received message. For example, in one embodiment, local proxy agent 274 may receive the message and encapsulate it into another message format that is enabled to operate within a tunnel. Thus, in one embodiment, local proxy agent 274 may encapsulate the message into a format capable of running over an HTTP connection, an IM protocol connection, and the like.

Similarly, local proxy agent 274 may also be configured to receive a response to the message and, as appropriate, convert the response to another format. For example, the response may be configured as SIP/RTP over TCP. Local proxy agent 274 may convert this response to be RTP over UDP, and SIP over UDP or TCP, as appropriate for the destination device. Local proxy agent 274 may employ processes such as described below in conjunction with FIGS. 4-5 to perform at least some of the above actions. Moreover, as mentioned above, local proxy agent 274 may be integrated within IM client 270. However, the invention is so constrained. For example, local proxy agent 274 may also be integrated with VOIP client 272, or any other combination of the above components may be arranged, without departing from the scope or spirit of the invention.

Illustrative Server Environment

Figure 3:
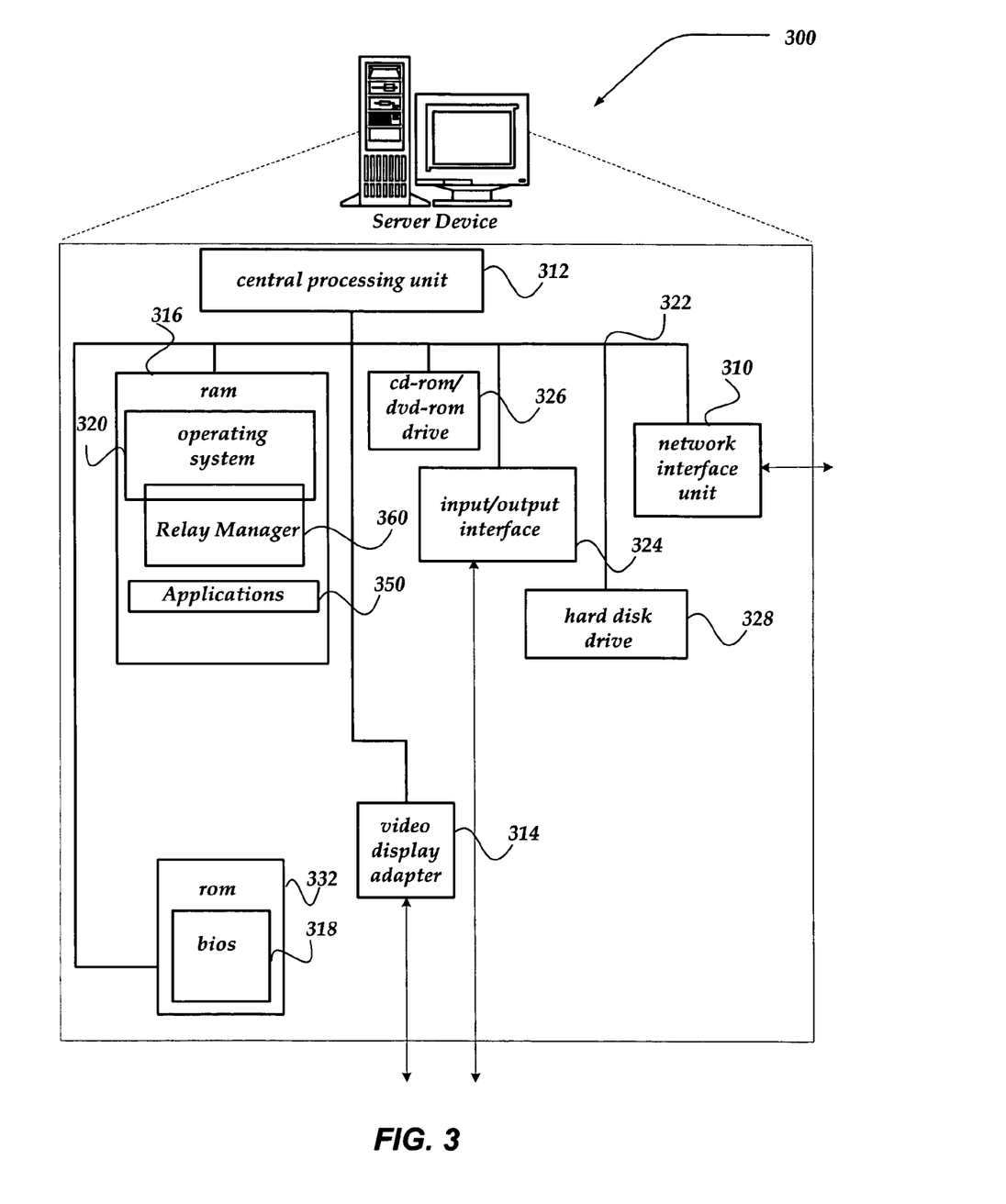
FIG. 3 shows one embodiment of a server device, such as a relay server, that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may, for example, relay server 131 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 218 is also provided for controlling the low-level operation of server device 300. As illustrated in FIG. 3, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 may also include an SMTP handler application for transmitting and receiving email. Server device 300 may also include an HTTP handler application for receiving and handing HTTP requests, and an HTTPS handler application for handling secure connections. The HTTPS handler application may initiate communication with an external application in a secure fashion.

Server device 300 also includes input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. Mass storage may further include applications such as relay manager 360.

Relay manager 360 is configured to receive media messages such as audio and video, including VOIP from one computing device and relay the message towards another device. In particular, however, relay manager 360 may receive an RTP/TCP packet from a source device. Relay manager 360 may employ a packet store, such as a buffer, or the like, (not shown) for use in saving the received packet. In one embodiment, the packet store may be configured as a FIFO buffer. The packet store may also be configured to receive and store packets that may be retransmitted to a destination device, due to packet loss, or the like.

Relay manager 360 may manage the packet store size to manage a control of a flow of packets between the source and destination devices. Relay manager 360 may further provide a report to the source device indicating a quality of communications between server device 300 and the destination device. In one embodiment, the report is an RTCP report. However, virtually any report regarding the flow between relay manager 360 and the destination may be used. The report may be provided by the destination, and/or server device 300. In any event, the report may be provided to the source device for use in managing the flow of packets from the source device to server device 300. Although the source device may employ any of a variety of mechanisms to adjust its flow of packets, in one embodiment, the source device may select to employ a different codec on the media data. For example, the source device may select to use a lower speed (and/or bandwidth) codec that may increase the compression of the media data in the packets. By adjusting the rate of flow from the source device, relay manager 360 is enabled to provide the lost packets to the destination server through re-transmissions, and the like. Relay manager 360 may employ process 500 of FIG. 5 to perform at least some of these actions.

In one embodiment, relay manager 360 may be integrated within operating system 320. However, the invention is not limited to such an arrangement. As such, relay manager 360 may also be configured as a distinct application, as an application, firmware, or the like integrated within network interface unit 310, and the like.

Figure 6:
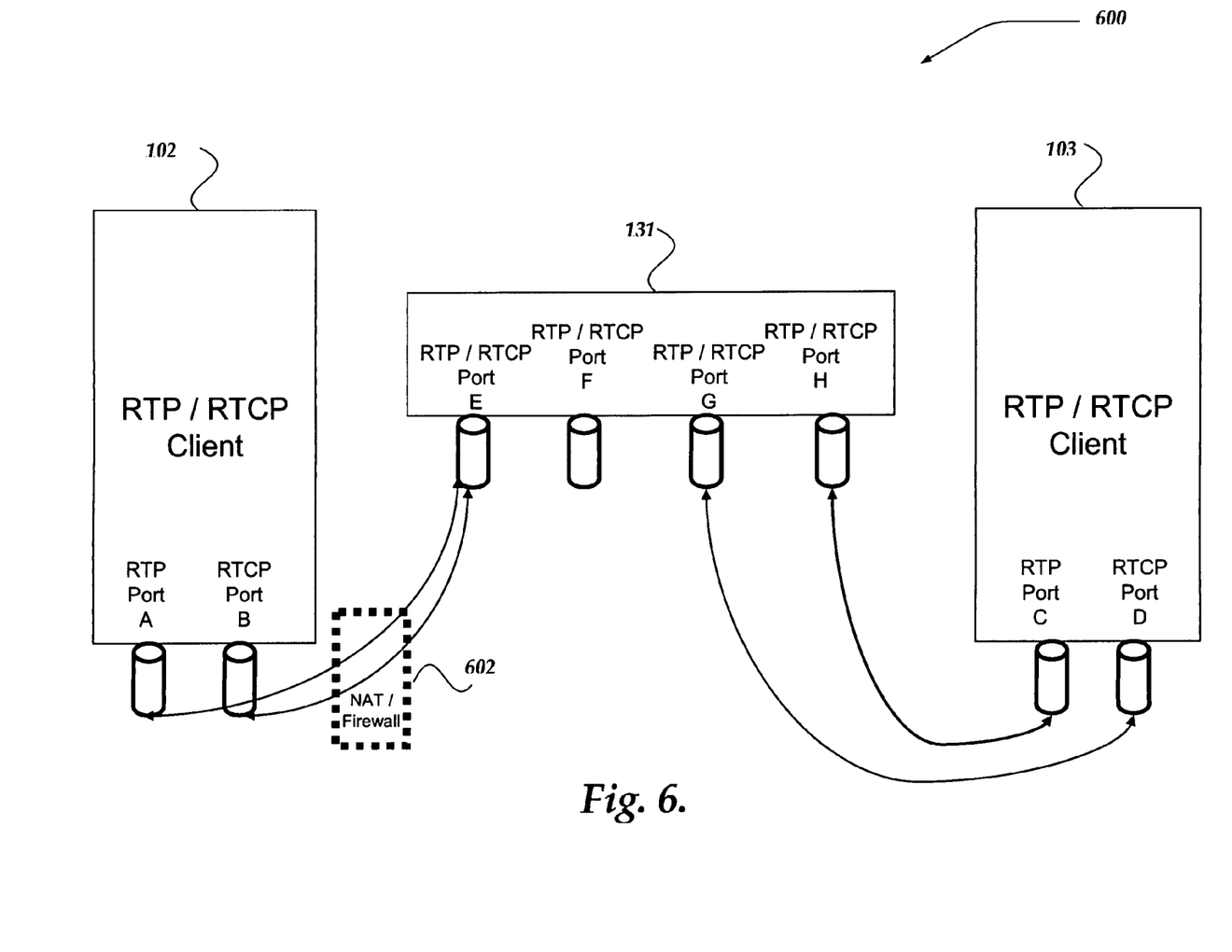
FIG. 6 shows a functional block diagram illustrating one embodiment of the relay server performing a port translation.
Figure 7:
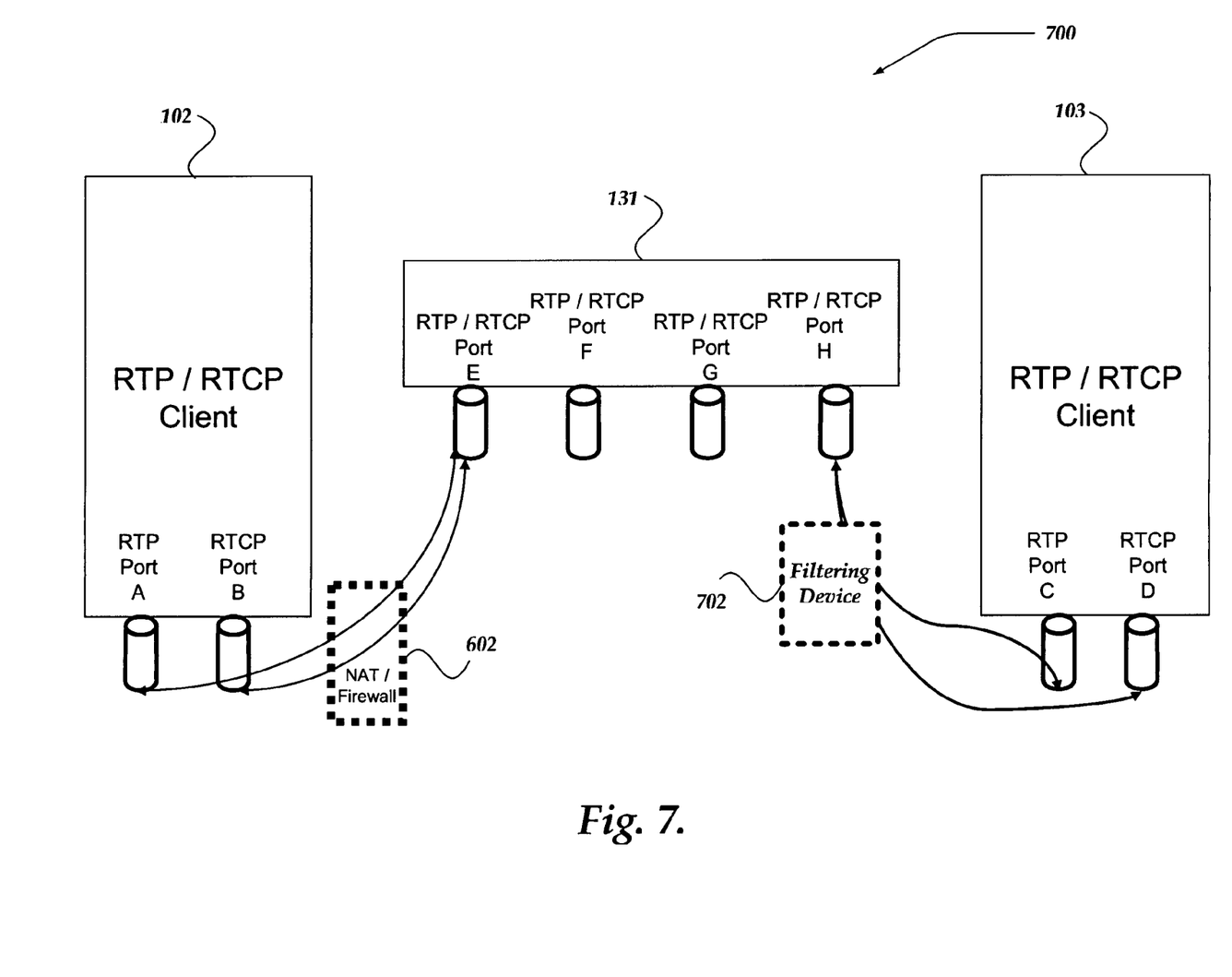
FIG. 7 shows a functional block diagram illustrating another embodiment of the relay server performing a port translation.

Relay manager 360 may also be configured to manage a port translation for the communications between the source device and/or the destination device. In some instances the source device may provide RTP packets from one port, and RTCP packets from another port of the source device. However, when a filtering device resides between the source device and server device 300, the RTP and RTCP packets may be provided to server device 300 on a single port. Relay manager 360 may therefore, be configured to examine a first message from the source device, and determine the type of data being sent, RTP or RTCP, and which port from which the data was sent by the client device. For example, relay manager 360 may receive a first message from the source device, examine the first message and determine that it is an RTP message. From the first message, relay manager 360 can determine that subsequent packets from that port of the source device are RTP packets. Similarly, for RTCP packets. Relay manager 360 may then provide the respective packets to the destination device employing one or more ports. Responses from the destination device may be managed in a similar manner. Thus, relay manager 360 may perform port translations. FIGS. 6-7 illustrate two embodiments of such an arrangement Illustrative Port Translations FIG. 6 shows a functional block diagram illustrating one embodiment of the relay server performing a port translation. Port translation system 600 may include many more components than those shown. The components shown, however, are sufficient to disclose an illustrative embodiment for practicing the invention. Port translation system 600 includes client devices 102-103, and relay server 131, and filtering device 602. In one embodiment, filtering device 602 may represent a NAT, a firewall, a gateway, proxy server, or the like.

Client devices 102-103 are substantially similar to client device 102 and VOIP device 103 of FIG. 1, respectively. In addition, relay server 131 is substantially similar to relay server 131 of FIG. 1.

Also shown are examples, of various ports, A-H, where port A-B are located at client device 102, ports E-H are located at relay server 131, and ports C-D are located at VOIP device 103. Ports A and C are configured to manage RTP packets, while ports B and D are configured to manage RTCP packets. Ports E-H are configured to manage RTP and/or RTCP packets.

As shown, an RTP packet may flow from port A through filtering device 602 to port E at relay server 131. In addition, an RTCP packet may flow from port B through filtering device 602 to port E at relay server 131. Typically, where filtering device 602 is absent, relay server 131 may receive the RTCP packet at a port other than where the RTP packet is received. However, due to the presence of filtering device 602, relay server 131 may receive the RTP and RTCP packets at a same port. However, the destination device (VOIP device 103) may expect to receive and send the RTP and RTCP packets from different ports. Therefore, relay server 131 may perform a port translation.

Relay server 131 may perform the port translation by monitoring a first packet at port E from client device 102. Then based on the received first packet type, RTP or RTCP, relay server 131 may determine that all subsequent packets from port A or port B are of the same type of packet. Relay server 131 may then quickly separate incoming packets using this determination. Thus, relay server 131 may then receive all packets from port A, at port E, determine they are RTP packets based on the first packet analysis, and route the packets to VOIP device 103 over port H. Similarly, relay server 131 may filter out all packets from port B, at port E, based on the first packet analysis, and determine they are RTCP packets. Relay manager 131 may then route such packets to VOIP device 103 over port G, thus performing a port translation.

FIG. 7 shows a functional block diagram illustrating another embodiment of the relay server performing a port translation, in accordance with the present invention. Port translation system 700 of FIG. 7 illustrates a similar situation of FIG. 6, except that filtering device 702 may reside between relay server 131 and VOIP device 103. Filtering device 702 may operate similar to filtering device 602, and may be implemented as a gateway, a firewall, a proxy server, a NAT, or the like. Thus, as shown in FIG. 7, relay server 131 may receive send RTP and RTCP packets towards VOIP client 103 over a single port, port H.

Similarly, relay server 131 may receive packets from VOIP client 103 at port H, perform an analysis on the first received packet, and determine that all subsequent packets of a given port are of a given type. Thus, relay server 131 may determine based on the first received packet that all subsequent packets from port C are RTP packets, and all subsequent packets from port D are RTCP packets.

In addition, relay server 131 may provide both RTP and RTCP packets from VOIP device 103 to client device 102 over a single port, port E. Relay server 131 may employ a process such as described below in conjunction with FIG. 8 to perform such port translations.

Generalized Operation

Figure 4:
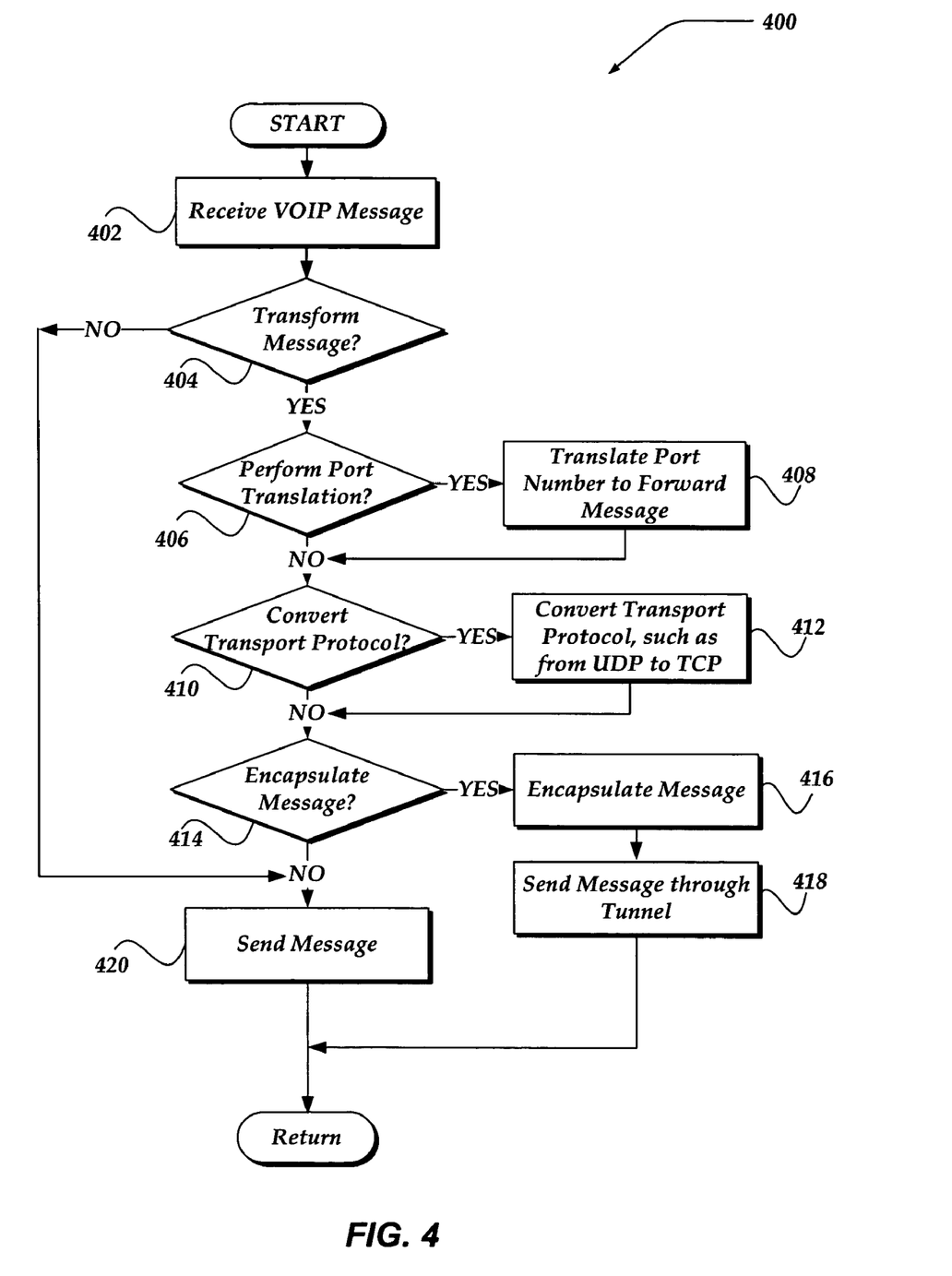
FIG. 4 illustrates a logical flow diagram generally showing one embodiment of a process for managing a VOIP message at a client.

The operation of certain aspects of the invention will now be described with respect to FIG. 4. FIG. 4 illustrates a logical flow diagram generally showing one embodiment of a client process for managing a VOIP message at a client device. Process 400 of FIG. 4 may be employed, for example, by local proxy agent 274 of FIG. 2 for a message received from a VOIP phone, and the like, that is to be sent across a network.

Process 400 begins, after a start block, at block 402, where a VOIP message is received. As described above, the VOIP message may be based on the SIP/RTP protocols. Moreover, in one embodiment, the VOIP message may employ UDP as a transport protocol. However, because many of today's VOIP devices may be unable to communicate messages structured in this format to a corresponding server provider, another computing device, and the like, it may be desirable to transform the message. This may be the case, for example, where some other computing device resides behind a firewall, NAT, and the like, that is configured to block UDP, well-known UDP ports, such as 5060, and the like. Therefore, processing flows to decision block 404 where a determination is made whether to transform the received VOIP message. If the VOIP message is not to be transformed, processing flows to block 420; otherwise, processing continues to decision block 406.

At decision block 406, a determination is made whether a port translation is to be performed for the message. That is, shall the message transformation include employing a different port number to send the message? If port translation is to be performed, processing flows to block 408; otherwise, processing continues to decision block 410. At block 408, the message is provided to another port, such as one that is likely not to be blocked. In one embodiment, the port number employed is configured for use with RTP/TCP, and/or SIP/TCP. Processing then continues to decision block 410.

At decision block 410, a determination is made whether to convert a transport protocol for the message. In one example, the message is employs UDP and it is determined that the message is to be converted to the TCP format, or the like. If the transport protocol is to be converted, processing branches to block 412; otherwise, processing proceeds to decision block 414. At block 412, the transport protocol for the message is converted to TCP. Conversion of the message from UDP to TCP may include modifying a transport header, providing a timestamp, buffer, managing sequencing, and the like. Processing then proceeds to decision block 414.

At decision block 414, a determination is made whether the message is to be encapsulated so that a tunneling protocol may be employed to communicate the message. If the message is to be encapsulated, processing branches to block 416; otherwise, processing proceeds to block 420, where the message is sent over an appropriate network. For example, the message may have been transformed to employ a TCP/IP based network. Upon completion of block 420, processing returns to a calling process to perform other actions.

At block 416, any of a variety of encapsulation mechanisms may be employed upon the message. For example, the message may be encapsulated within an IM protocol message packet, an HTTP protocol packet, a security packet such as IP encapsulation security payload (ESP), and the like. Upon encapsulation of the message into another message packet, processing flows to block 418, where the encapsulated message is forwarded through a tunnel, over an HTTP connection, an IM communication link, or the like, that is configured to manage the encapsulated message. The tunnel, connection, link, or the like, may have been established and configured prior to encapsulating the message, or even currently with the encapsulation of a first message. In any event, processing then returns to a calling process to perform other actions.

Receiving of a response to the message may be substantially similar to the above steps, except in perhaps a reverse order. Thus, un-encapsulation may be performed, where appropriate, followed by a transformation of the transport protocol and/or the port number employed. The resulting response may then be configured to employ UDP and/or UDP ports, rather than TCP and/or TCP associated ports. The transformed response may then be routed to its destination.

Figure 5:
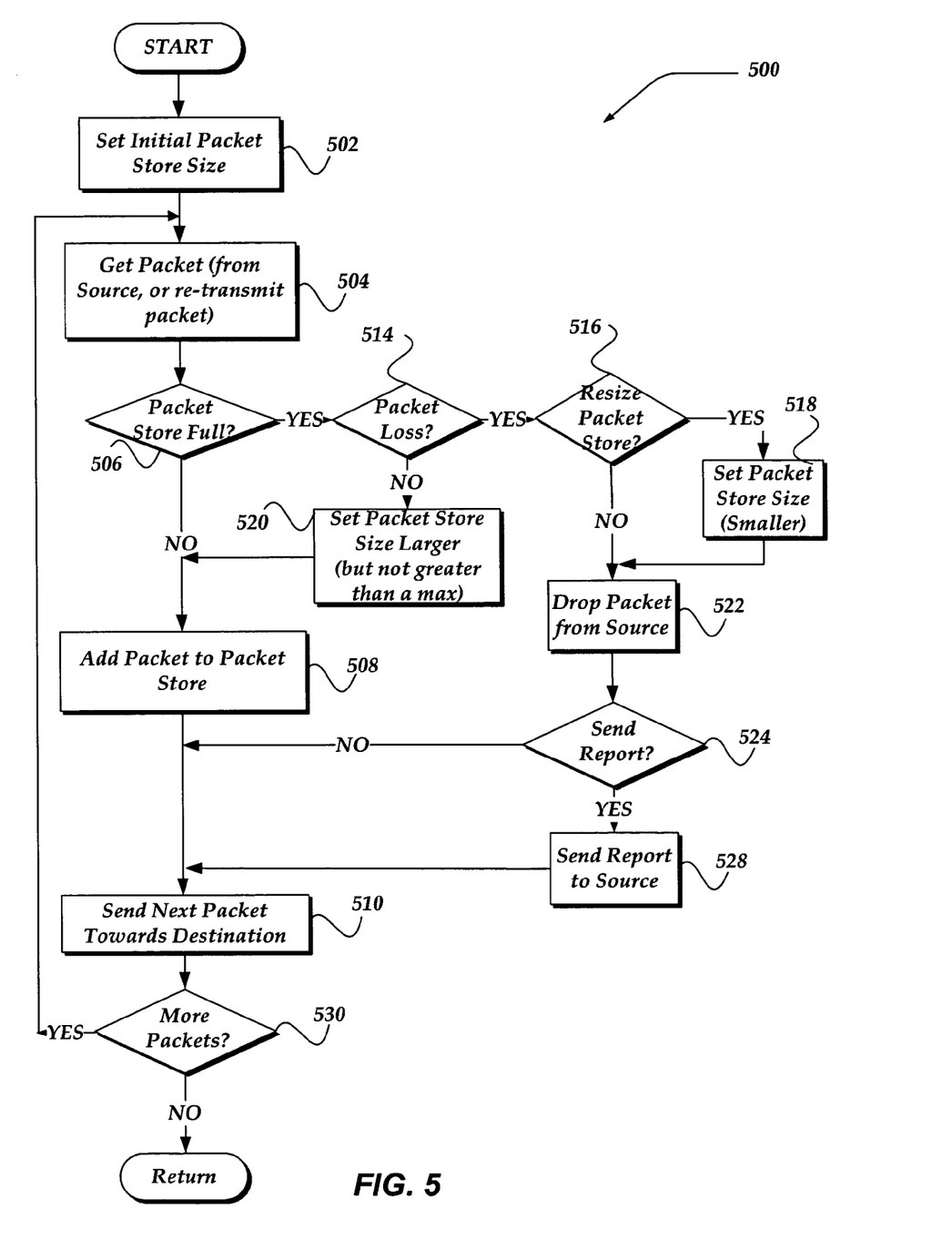
FIG. 5 illustrates a logical flow diagram generally showing one embodiment of a process for managing flow control of VOIP traffic over TCP/IP using buffer management.

FIG. 5 illustrates a logical flow diagram generally showing one embodiment of a process for managing flow control of VOIP traffic over TCP/IP using buffer management, in accordance with the present invention. Process 500 may be implemented in relay server 131 of FIG. 1.

Process 500 of FIG. 5 begins, after a start block, at block 502, where a size of a packet store is initialized. The packet store is initially configured as a TCP transmit packet storage area with approximately 100 bytes of packet storage, or sufficient space for around 5-8 TCP packets. Such a size may however, be set to virtually any value. However, the intent is to provide a sufficiently small enough packet store that TCP packet retransmissions may be readily managed. Thus, engineering judgment may be applied to vary the initial packet store. It is of interest to note that typically, such TCP transmit packet store are around 2000 bytes, or so. In any event, processing flows to block 504, where a TCP packet is received. In one embodiment, the TCP packet may be employ RTP over TCP. The TCP packet may be a retransmit packet, or it may be a TCP packet from a source device, such as client device 102, VOIP device 103, or the like. Processing flows next to decision block 506.

At decision block 506, a determination is made whether the packet store is full. In a first cycle through process 500, it is unlikely that the packet store is full. If the packet store is not full, such that another TCP packet may be stored within it, processing flows to block 508 where the TCP packet is added to the packet store; otherwise, processing branches to decision block 514.

At decision block 514, if the packet store is substantially full, a determination is made whether there are a predefined amount of identified packet losses between the present device, e.g., the relay server, and the destination device. The packet store may be substantially full, for example, when the current packet size might exceed the packet store capacity.

Packet losses may arise, for example, where the destination device is on a noisy communication link, where the communication link is slower than the communication link between the source device and the relay server, or the like. In such situations, the communication with the destination device may result in lost packets. Such a loss in packets may result in an action on the part of the relay server to retransmit the lost packets. Thus, the present device is aware of a presence of retransmit packets. Such retransmit packets, may even be stored within packet store. Moreover, in one embodiment, packet retransmits may be determined based on whether an amount of retransmits exceed some predetermined number within a predefined period of time, or the like. In any event, if it is determined that there is no current packet loss, then processing may flow to block 520; otherwise, processing branches to decision block 516.

At block 520, an absence of identified packet loss may indicate that the packet store size may be set too small. This may arise, for example, where the destination device is able to 'keep up' with the packet transmissions. Therefore, the packet store may be reset to a larger size to allow for additional packet storage. Processing flows then to block 508, where the TCP packet is added to the packet store. Processing then continues to block 510.

At decision block 516, a determination is made whether to, due to packet loss, resize the packet store. Resizing the packet store may be based on a variety of conditions, including, whether the packet store is at a predetermined minimum, whether a ratio of retransmit packets to transmit packets is above a predefined value, or the like. In any event, if it is determined that the packet store is not to be resized processing proceeds to block 522; otherwise, processing continues to block 518, where the packet store's size may be lowered. In one embodiment, the size is lowered by a predetermined number of bytes, number of packets, or the like. Processing then blocks to block 522. At block 522, the TCP packet is dropped. Processing flows next to decision block 524.

At decision block 524, a determination is made whether to send a report to the source device to indicate that packet loss is occurring, and to further attempt to direct the source device to modify its rate of transmission of packets. If it is determined that a report is not to be sent, processing proceeds to block 510. If a report is to be sent, however, processing continues to block 528, where the report indicating flow congestion, packet loss, and the like, may be provided to the source device. In one embodiment, the report is an RTCP report. In another embodiment, the RTCP report is provided by the destination device, and is provided back to the source device. In another embodiment, the RTCP report is prepared by the relay server and provided back to the source device. Processing then continues to block 510, where the next packet in the packet store is sent towards the destination device. Upon completion of block 510, process 500 moves to decision block 530, where a determination is made whether there are more packets to be relayed. If there are, process 500 loops back to block 504 to continue until there are no more packets for the current destination device from the current source device. Upon relaying of the packets to the destination device, process 500 then may return to a calling process to perform other actions.

Figure 8:
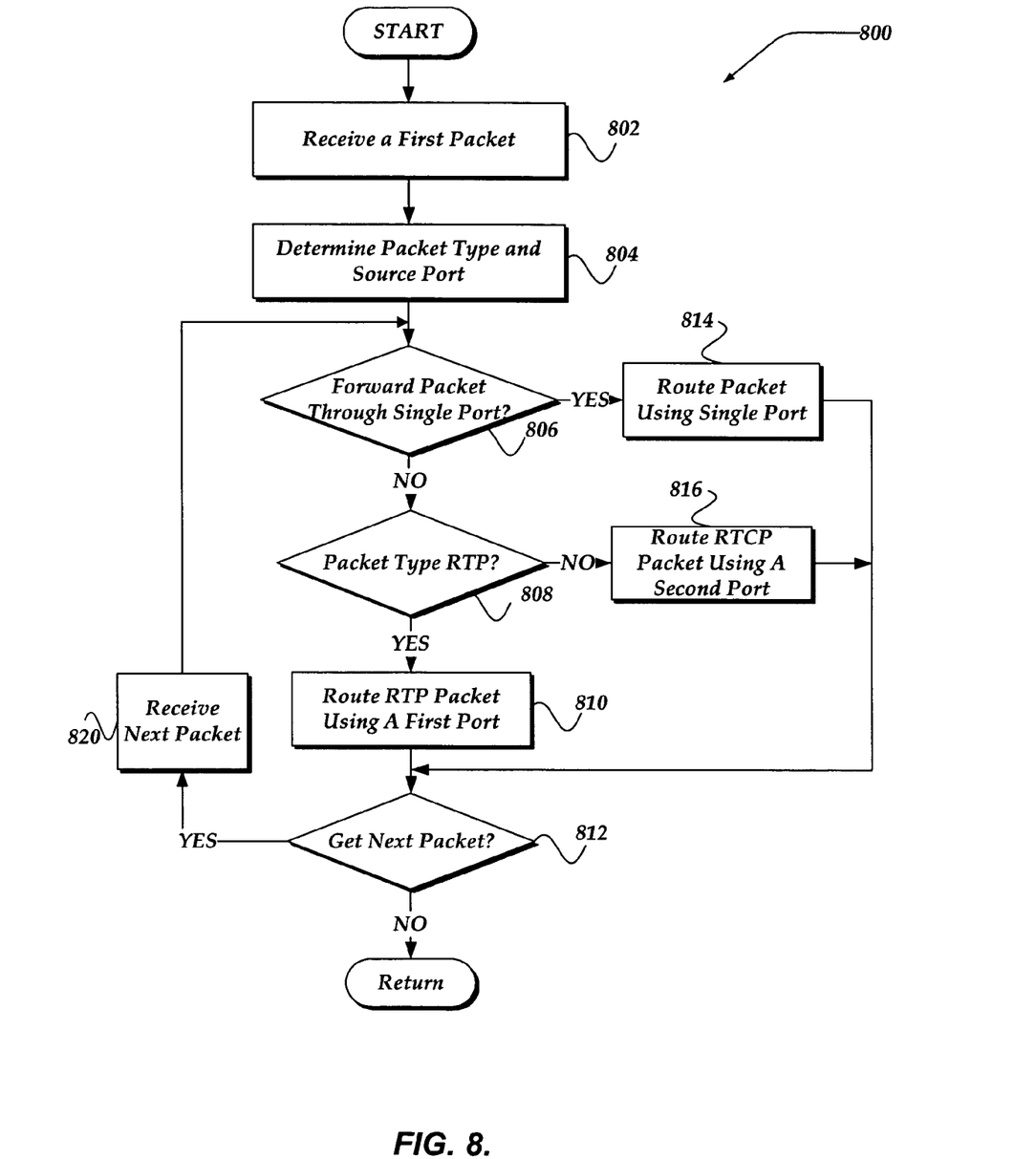
FIG. 8 illustrates a logical flow diagram generally showing one embodiment of a process for managing port translations, in accordance with the present invention.

FIG. 8 illustrates a logical flow diagram generally showing one embodiment of a process for managing port translations, in accordance with the present invention. Process 800 may, for example, be implemented within relay server 131 of FIG. 1.

Process 800 of FIG. 8 begins, after a start block, at block 802 when a first packet is received through a filtering device, such as a NAT, a firewall, gateway, proxy server, and the like. In some situations, the filtering device may be configured not to allow multiple destination ports for such as VOIP messages. Thus, in those situations, the relay server, or other device may receive the VOIP message packets for RTP, RTCP, and the like, at a same port, such as illustrated in FIGS. 6-7.

Processing then flows to block 804, where a determination is made using the first received packet to determine its source port, and its packet type, such as RTP, RTCP, or the like. Based upon this determination, subsequent packets from the same client device for this session may be quickly sorted and, if provided to a different port for sending towards the destination device. Thus, for example, if it is determined that the packet is an RTP packet, from source port A, it may be assumed that subsequent packets from source port A are also RTP packets. Similarly, if it is determined that the packet is an RTCP packet, from source port AB, it may be assumed that subsequent packets from source port A are also RTCP packets.

Flowing next to decision block 806, a determination may be made whether to forward the received packet over a single port or multiple ports. That is, are RTP and RTCP packets to be forwarded over a same port or different ports. If it is determined that a single port is to be employed, processing flows to block 814, where the received packet is routed using a single port. FIG. 7 illustrates this action, as forwarding the packet from port H. Processing flows next to decision block 812.

Alternatively, if at decision block 806, it is determined to forward received packets over multiple ports, processing flows to decision block 808, where a determination is made whether the received packet type is an RTP packet. If the received packet type is an RTP packet, processing flows to block 810, where the RTP packet is forwarded to the destination device from a first source port; otherwise, processing flows to block 816, where a second source port is employed to forward the RTCP packet towards the destination device.

After completion of block 810 or block 816, processing flows to decision block 812, where a determination is made whether there are more packets to be managed for the communication between the source client and destination client. If there are more packets, processing flows to block 820, where a next packet is received. Processing then loops back to decision block 806 until there are no more packets for this communications. Processing then returns to the calling process to perform other actions.

RTP/RTCP packets from the destination client (VOIP device 103 of FIG. 6) may be managed in a similar manner. However, it may arise that the destination client's packets are not filtered, such that they are received at separate ports, as illustrated by FIG. 6. In this instance, the type of packet received may be determined based on the received port. Forwarding of the received packets towards the source client (client device 102 of FIG. 6) may result in a port translation such that both RTP and RTCP packets are sent using the same relay server port (port E in FIG. 6). Thus, process 800 may be employed for RTP/RTCP packets from the destination client, with the above clarifications.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing network packets over a network, comprising:
   setting a size for a packet store at a relay server;
   receiving a network packet from a source device addressed to a destination device at the relay server, wherein the network packet is configured to employ a Transmission Control Protocol (TCP) transport protocol; and
   if the packet store is substantially full, the relay server performs actions, including:
      dropping the received network packet at the relay server,
      sending a report generated by the relay server to the source device when the received network packet is dropped, wherein the report enables the source device to modify a rate of transmission of the network packets over the network by at least one of modifying a codec and changing a codec employed to process the network packets,
      determining, based on a first received network packet in the network packets, a packet type and a source port, wherein the packet type includes at least one of a Real-time Transport Protocol (RTP) or a Real-time Transport Control Protocol (RTCP) packet type,
      if the network packets are to be sent employing a single port, sending each RTP and RTCP packet of the network packets to the destination device using the single port, and
      if the network packets are to be sent employing multiple ports, sending each RTP packet of the network packets using a first port, and sending each RTCP packet of the network packets using a second port.

2. The method of claim 1 wherein the network packets further comprise at least one of Voice Over IP (VOIP) packet, a voice packet, a video packet, a text data packet, or an Instant Messaging (IM) packet.

3. The method of claim 1, wherein the sending the report further comprises generating the report by at least one of the relay server configured to implement the method or the destination device, where the network packets are intended for the destination device.

4. The method of claim 1, wherein if the packet store is substantially full further comprises:
   determining if a predetermined number of packet retransmits have occurred within a predefined period of time, and if not, resizing the packet store to a larger packet capacity.

5. The method of claim 1, wherein the method is implemented as computer-readable instructions within the relay server, and the source device is a mobile device.

6. The method of claim 1, further comprising: removing another network packet from the packet store and forwarding the removed network packet to the destination device.

7. A relay server for use in managing Voice over IP (VOIP) packets over a network, comprising:
   a transceiver for receiving and sending packets to another computing device;
   a processor in communication with the transceiver; and
   a memory in communication with the processor and for use in storing data and machine instructions that causes the processor to perform a plurality of operations, including:
   setting a size for a packet store;
   receiving a VOIP packet from a source device, the VOIP packet being destined for a destination device, and is configured to employ a Transmission Control Protocol (TCP) transport protocol; and
   if the packet store is substantially full:
      determining if there is a predetermined packet loss within a predefined period of time, and if there is:
      dropping the received VOIP packet at the relay server,
      sending a report generated by the relay server to the source device when the received network packet is dropped, wherein the report enables the source device to modify a rate of transmission of VOIP packets over the network by at least one of modifying a codec and changing a codec employed to process a next VOIP packet, determining, based on a first received VOIP packet in the VOIP packets, a packet type and a source port, wherein the packet type includes at least one of a Real-time Transport Protocol (RTP) or a Real-time Transport Control Protocol (RTCP) packet type, if the VOIP packets are to be sent employing a single port, sending each RTP and RTCP packet of the VOIP packets to the destination device using the single port, and if the VOIP packets are to be sent employing multiple ports, sending each RTP packet of the VOIP packets using a first port, and sending each RTCP packet of the VOIP packets using a second port.

8. The relay server of claim 7, wherein the received VOIP packet employs at least one of a Session Initiation Protocol (SIP) or a Real-time Transport Protocol (RTP).

9. The relay server of claim 7, wherein the report is generated by at least one of the relay server or the destination device.

10. The relay server of claim 7, further comprising:
if the packet store includes sufficient capacity to store the received VOIP packet, storing the packet in the packet store; and
sending a prior received VOIP packet stored in the packet store towards the destination device, by employing a first-in/first-out selection mechanism to select the prior received VOIP packet.

11. The relay server of claim 7, further comprising:
if the packet store is substantially full, but the predetermined packet loss is absent, increasing the packet store capacity.

12. The relay server of claim 7, wherein if the predetermined packet loss has not occurred, resizing the packet store size.

13. A system for use in managing Voice over IP (VOIP) packets over a network, comprising:
a client device that is configured to perform actions, including:
if a VOIP packet employs a user datagram transport protocol (UDP), converting the transport protocol to a transmission control protocol (TCP); and
sending the converted VOIP packet towards a relay server that is useable to relay the converted VOIP packet to a destination device; and
the relay server in communication with the client device and the destination device and is configured to perform actions, including:
receiving the converted VOIP packet from the client device; and
if a packet store configured to receive and store VOIP packets is substantially full:
dropping the received VOIP packet at the relay server,
sending a report generated by the relay server to the client device when the received network packet is dropped, wherein the report enables the client device to modify a rate of transmission of VOIP packets over the network by at least one of modifying a codec and changing a codec employed to process a next VOIP packet,
determining, based on a first received VOIP packet in the VOIP packets, a packet type and a source port, wherein the packet type includes at least one of a Real-time Transport Protocol (RTP) or a Real-time Transport Control Protocol (RTCP) packet type, and
if the VOIP packets are to be port translated, employing an association of the source port to packet type that is determined based on the first received VOIP packet to forward each VOIP packet in the VOIP packets using a translated source port.

14. The system of claim 13, wherein the destination device is a mobile device.

15. The system of claim 13, wherein the report is generated by at least one of the relay server or the destination device.

16. The system of claim 13, wherein the report is generated employing, at least in part, the Real-time Transport Control Protocol (RTCP).

17. A system for use in managing Voice over IP (VOIP) packets over a network, comprising:
a client device that is configured to perform actions, including:
if a VOIP packet employs a user datagram transport protocol (UDP), converting the transport protocol to a transmission control protocol (TCP); and
sending the converted VOIP packet towards a relay server that is useable to relay the converted VOIP packet to a destination device; and
the relay server in communication with the client device and the destination device and is configured to perform actions, including:
receiving the converted VOIP packet from the client device; and
if a packet store configured to receive and store VOIP packets is substantially full:
dropping the received VOIP packet at the relay server,
sending a report generated by the relay server to the client device when the received network packet is dropped, wherein the report enables the client device to modify a rate of transmission of VOIP packets over the network by at least one of modifying a codec and changing a codec employed to process a next VOIP packet,
if the VOIP packets are to be sent employing a single port, sending each RTP and RTCP packet of the VOIP packets to the destination device using the single port; and
if the VOIP packets are to be sent employing multiple ports, sending each RTP packet of the VOIP packets using a first port, and sending each RTCP packet of the VOIP packets using a second port.

* * * * *